Sept. 5, 1961  C. VAN DER LELY ET AL  2,998,691
ROTARY RAKING WHEEL
Filed Feb. 3, 1954
FIG. 1
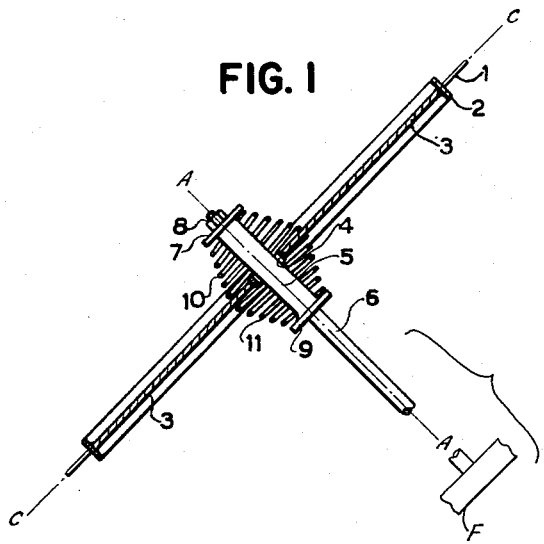
FIG. 2
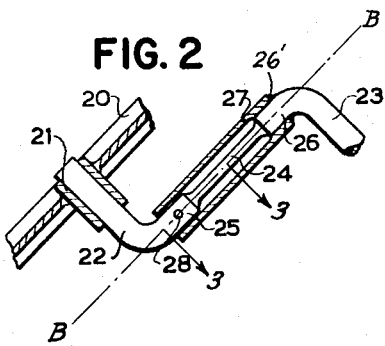
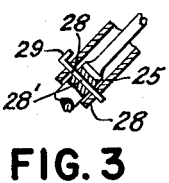
FIG. 3

United States Patent Office 2,998,691
Patented Sept. 5, 1961

2,998,691
ROTARY RAKING WHEEL
Cornelis van der Lely and Ary van der Lely, Maasland, Netherlands, assignors to C. van der Lely N.V., Maasland, Netherlands, a limited company of the Netherlands
Filed Feb. 3, 1954, Ser. No. 407,985
Claims priority, application Netherlands Mar. 2, 1953
8 Claims. (Cl. 56—377)

This invention relates to a rake assembly for use in a raking device for laterally displacing rakable substance lying on the ground.

In raking devices having raking members, such as rotary rake wheels which are obliquely arranged with regard to the traveling direction of the device and which are put into rotation by their coming into touch with the ground, the oblique position of the rake wheels in conjunction with the unevenness of the ground results not only in the lifting up of the wheel, but also in a tendency to exert upon the wheel appreciable horizontal forces in a transverse direction. This may damage the wheel and the turf on the ground. This is also the result when the rake wheel is provided at its circumference with resilient teeth which cannot avoid a contact of the wheel rim with uneven portions of the ground.

An object of the present invention is to provide a rake assembly for raking devices by which the magnitude of the undesired forces will be considerably reduced. In accordance with the invention, this rake assembly comprises in combination: a bearing shaft; a raking member having a plurality of peripherally arranged raking elements and which is mounted at its central portion for free rotation upon an end of said bearing shaft; and resilient means in said rake assembly permitting canting movements of the central portion of said raking member whereby the relative position between the raking member and the other end of said bearing shaft is changed. Due to the possibility of resilient canting of the raking member obtained in this manner, the occurring forces will be considerably limited, since only small forces will now cause sufficient yielding movements of the raking member and thereby avoid damages of the rake assembly as well as of the turf.

Further objects, features and details of the present invention will appear from the following description with reference to the accompanying drawing in which two preferred embodiments have been illustrated by way of example and in which:

FIG. 1 shows a horizontal section of a rake assembly according to a first embodiment of the invention, taken through the axis of the rake wheel, and FIG. 2 shows part of a rake assembly according to a second embodiment in a sectional view similar to FIG. 1.

FIG. 3 is a sectional view of the apparatus taken on lines 3—3 of FIG. 2 illustrating an improvement within the scope of the invention.

The rake wheel shown in FIG. 1 comprises a plurality of raking teeth 1 mounted on a rim 2 which is carried by a wheel disk 3 having a central opening 4 through which extends with some clearance a hub 5. The edge of the material defining opening 4 is thickened. The hub 5 is mounted for free rotation upon one end of a bearing shaft 6 which is supported on a frame F in conventional manner, which forms part of a crank, as will be shown hereinafter with reference to FIG. 2. Near said end of the shaft 6 the hub 5 is provided with a disk shaped retaining member 7 which can be removed by loosening a nut 8 fitting upon the threaded end of the hub 5. The other end of the hub 5 is provided with a retaining member 9.

Between the disk 3 and each retaining member 7 and 9, respectively, is provided a conical coiled spring 10 and 11, respectively, the center lines of said springs coinciding with the axis of rotation A—A of the hub 5.

If a transverse force acts upon the circumference of the rake wheel, the disk 3, by deforming the springs 10 and 11, is able to perform canting movements about a radial line in the wheel plane, i.e. about any axis, e.g. about the horizontal axis C—C, at right angles to the axis of rotation A—A of the hub 5. Upon such canting or yielding movement the relative position between the rake wheel and each point of the bearing shaft will be changed. An appreciable movement of the wheel in its plane in a direction at right angles to the hub 5 is, however, prevented by the thickened edge of the disk 3.

According to the embodiment shown in FIG. 2 a rake wheel 20 is mounted with its hub 21 for free rotation upon one end of a crank, 22, 23, 24, constituting the bearing shaft of the rake assembly (see e.g. the British patent specification 680,537). The crank pin 22 and the crank shaft 23 of said crank are interconnected by an arm of which the mid-portion 24 has a smaller diameter than its end portions 25 and 26. Said mid-portion 24 is surrounded by a rigid tube 27, one end of which extends up to the end portion 26 and is welded thereto at 26', whilst the other end of the tube 27 constitutes a bearing for the end 25 of the crank arm, said other end of the tube preventing rotation of the pin 22 with regard to the crank shaft 23 except about the center line B—B of the crank arm. Rotation about this center line is only opposed by the torsional stiffness of the mid-portion 24. By adopting a suitable diameter and length of this mid-portion 24, the torsional stiffness of this portion 24 can be chosen so as to enable the wheel 20 to perform the required resilient canting movements by twisting the portion 24 of the crank arm. It will be evident that upon any of such canting movements, although the wheel 20 will not change its position in relation to the crank pin 22, the relative position between said wheel and the other end of the bearing shaft, viz. the crank shaft 23, will be changed. In contradistinction to the embodiment according to FIG. 1, the wheel 20 is canted about an axis which is situated outside the wheel plane and extends substantially in the direction of the crank arm.

In order that the canting movements of the wheel 20, if not desired, can be prevented, the tube 27 and the end 25 of the crank arm may be provided with corresponding piercings 28 and 28', so that a pin 29 may be inserted therethrough as shown in FIG. 3.

It will be evident that the rake wheel on the resilient crank according to FIG. 2 may be of the construction shown in FIG. 1, in which case each of the two resilient structures may be made relatively stiff.

What we claim is:

1. A rake assembly for use in a raking device for laterally displacing rakable substance lying on the ground comprising: a bearing shaft having the shape of a crank having an end constituting a crank pin; a rake wheel mounted for free rotation upon the end which constitutes the crank pin; and means having substantial resilience positioned between the end of said bearing shaft which constitutes the crank pin and the other end of said bearing shaft, said resilient means permitting canting movements of said rake wheel whereby the relative position between the rake wheel and the other end of said bearing shaft is changed.

2. A rake assembly as defined in claim 1 wherein the means between the end of said bearing shaft which constitutes the crank pin and the other end of said bearing shaft are constituted by a crank arm adapted to provide substantial torsional deformation.

3. A rake assembly as defined in claim 2 wherein means are provided for selectively preventing twisting of said crank arm.

4. A rake assembly as defined in claim 2 comprising a rigid tube surrounding said crank arm, said rigid tube being fixedly connected at only one end to said bearing shaft to avoid bending of said arm without interfering with the torsional deformation thereof.

5. A rake assembly as defined in claim 2 wherein the crank arm has a mid-portion of reduced cross-sectional area and is surrounded by a rigid tube, one end of said rigid tube being fixedly connected to the portion of the crank arm adjacent to one extremity of said reduced mid-portion and the other end of said rigid tube constituting a bearing for the portion of the crank arm adjacent to the other extremity of said reduced mid-portion.

6. A rake assembly as defined in claim 5 comprising a locking pin and wherein the other end of said rigid tube and the portion of the crank arm surrounded by said end are provided with corresponding piercings for inserting said locking pin.

7. A rake assembly used in a raking device for lateral-displacing rakable substance lying on the ground, comprising a bearing shaft having two ends, a rake wheel, a plurality of raking elements arranged peripherally on said rake wheel, said rake wheel being mounted at its central portion for free rotation upon one of the ends of said bearing shaft, the bearing shaft between the rake wheel and the other of the ends of said shaft being divided into at least two parts of different cross section, one of said parts being resiliently connected to the other to permit canting movements of said rake wheel.

8. A rake assembly for use in a raking device for laterally displacing rakable substance lying on the ground, comprising: a bearing shaft having the shape of a crank, a rake wheel mounted for free rotation upon an end of said bearing shaft; and resilient means operatively associated with and positioned between said wheel and the other end of said bearing shaft, said resilient means permitting canting movements of said rake wheel whereby the relative position between the rake wheel and the frame is changed.

References Cited in the file of this patent

UNITED STATES PATENTS

| | | | |
|---|---|---|---|
| Re. 8,384 | Beers | Aug. 20, | 1878 |
| 147,503 | Johnson | Feb. 17, | 1874 |
| 150,187 | Pray | Apr. 28, | 1874 |
| 1,404,409 | Saverley | Jan. 24, | 1922 |
| 2,447,354 | Morrill | Aug. 17, | 1948 |
| 2,602,280 | Crowe et al. | July 8, | 1952 |
| 2,603,053 | Lipe et al. | July 15, | 1952 |
| 2,622,931 | Petrelli | Dec. 23, | 1952 |
| 2,635,411 | Hicks | Apr. 21, | 1953 |
| 2,651,902 | Curry | Sept. 15, | 1953 |
| 2,680,343 | Enos | June 8, | 1954 |
| 2,683,345 | Meyer | July 13, | 1954 |
| 2,689,446 | Sorrels | Sept. 21, | 1954 |
| 2,712,723 | Ryan | July 12, | 1955 |